No. 677,341. Patented July 2, 1901.
T. F. CRARY.
MANUFACTURE OF STOVEPIPE ELBOWS, &c.
(Application filed Mar. 18, 1901.)
(No Model.) 2 Sheets—Sheet 1.
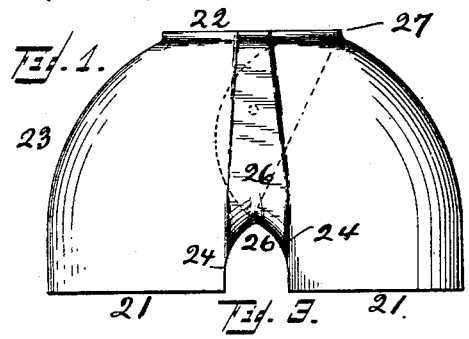
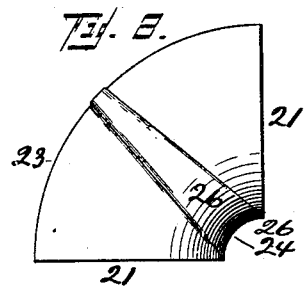
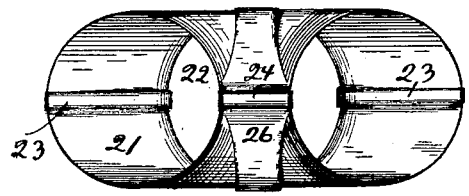
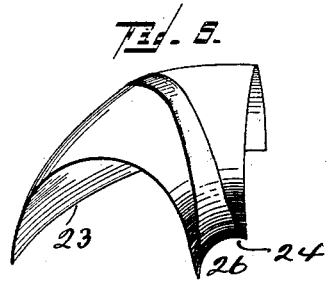
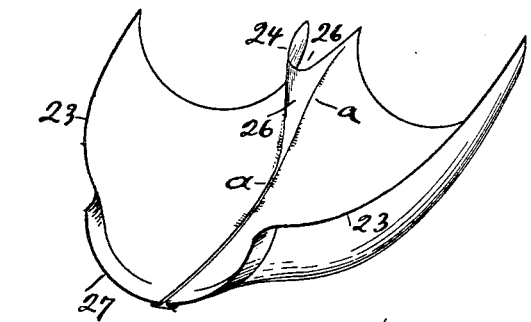
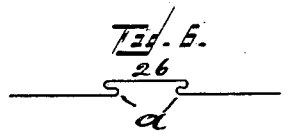
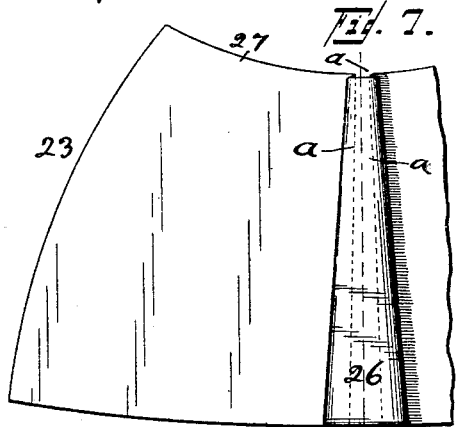
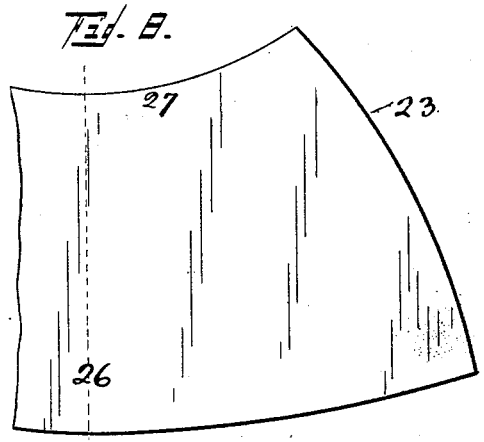
Witnesses
Arthur Kline
Geo. B. Sullivan
Inventor
Thomas F. Crary
by C. Spengel atty.
THE NORRIS PETERS CO., PHOTO-LITHO., WASHINGTON, D. C.

No. 677,341. Patented July 2, 1901.
T. F. CRARY.
MANUFACTURE OF STOVEPIPE ELBOWS, &c.
(Application filed Mar. 18, 1901.)
(No Model.) 2 Sheets—Sheet 2.
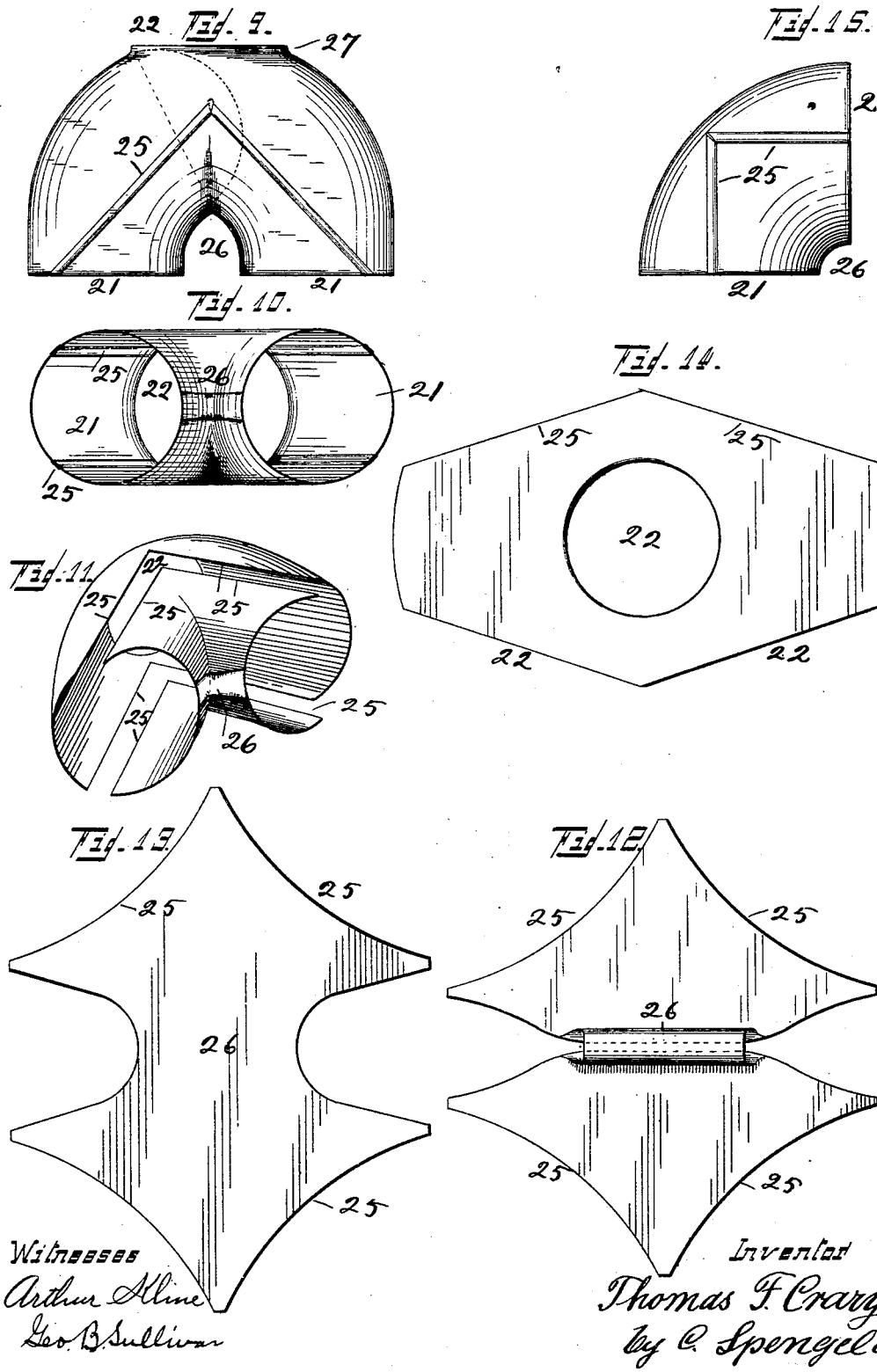
Witnesses
Arthur Aline
Geo. B. Sullivan
Inventor
Thomas F. Crary
by C. Spengel att.

UNITED STATES PATENT OFFICE.

THOMAS F. CRARY, OF MIDDLEPORT, OHIO.

MANUFACTURE OF STOVEPIPE-ELBOWS, &c.

SPECIFICATION forming part of Letters Patent No. 677,341, dated July 2, 1901.

Application filed March 18, 1901. Serial No. 51,621. (No model.)

*To all whom it may concern:*

Be it known that I, THOMAS F. CRARY, a citizen of the United States, residing at Middleport, in the county of Meigs and State of Ohio, have invented certain new and useful Improvements in the Manufacture of Certain Sheet-Metal Articles; and I do hereby declare the following to be a full, clear, and exact description of the invention, such as will enable others skilled in the art to which it appertains to make and use the same, reference being had to the accompanying drawings, and to the figures of reference marked thereon, which form a part of this specification.

This invention relates to improvements in the manufacture of certain sheet-metal articles which present substantially tubes of limited length and are curved so as to change the course of whatever may pass through them in an angular direction. Elbows for stove or other pipes and rain-water cut-offs used in connection with cisterns are of the class of articles which come within the scope of this invention. As a rule, and especially in case of this latter article, the angular or curved shape is now obtained by using a number of short sections, each of the proper tubular shape and all joined to each other at an angle, there being a sufficient number of such sectional pieces to produce the desired curve. My invention contemplates the manufacture of such tubular curved articles in a manner so as not to require more than two pieces, each of which latter is to be stamped out or pressed to shape in one operation, after which the two pieces shaped to be complementary to each other are joined together by any suitable seam. As against articles in shape of angular or curved tubes constructed of a number of sections to be joined afterward to produce the curved shape the advantage of my mode of manufacture is less pieces, therefore less joints and less labor, all resulting in reduced manufacturing cost. I am also enabled to obtain the desired angle with a shorter and more abrupt turn, thus permitting use of smaller pieces of material, whereby also the cost is reduced.

In the following specification, and particularly pointed out in the claims, is found a full description of the invention, together with its method of manufacture and construction, which latter is also illustrated in the accompanying drawings, in which—

Figure 1 shows a side view of the shell or housing of a rain-water cut-off. Fig. 2 shows in a side view a customary elbow, which may serve as a stovepipe-elbow. Fig. 3 is an under side view of Fig. 1. Fig. 4 is a perspective view of one of the two pieces or sections of which the cut-off shell is composed, the inner side being shown. Fig. 5 in a similar view shows one of the two sections of which the elbow is composed, the outer side being shown. Fig. 6 shows part of an edge view of the blank as it appears in Fig. 7, which shows a little more than half of the blank as it appears after having gone through the first step of manufacture. Fig. 8 shows part of the blank as it appears at the start of operations. Fig. 9 shows a side view of a cut-off of a modified construction. Fig. 10 is an under side view of the preceding figure. Fig. 11 shows in a perspective view the two complementary parts of the article as they appear after pressed to shape, but before connected to each other. Fig. 12 shows the blank of the inner one of these two complementary parts as it appears before being pressed to shape. Fig. 13 shows the same blank as it appears at the beginning of operations. Fig. 14 is a similar view of the blank of the outer one of the two sections. Fig. 15 shows a side view of an elbow constructed in a similar manner as the cut-off shown in Fig. 9.

In the shaping of such articles by pressing or stamping the metal suffers contraction and expansion, and the difficulty to be overcome is to prevent breaking and tearing of the same during its manipulation. Where the depressions, cavities, or undulations in shape do not go beyond certain limits, such as in ordinary flat and shallow tinware, the metal will stand the strain without serious results; but in articles of the kind here contemplated, being tubular pieces to be curved, and where the metal is to be bent in two planes or directions at the same time, one curve in one plane being part of the curve which produces the tubular shape and the other being the curve corresponding to the angular turn which the completed tubular article is to assume, the contraction and expansion required to obtain these shapes is too extensive for the textural resistance of the metal to stand, and as a result this latter cracks and tears if an attempt is made to obtain the desired shapes by the action of a press. To obtain, however, the advantage of manufacture by stamping or pressing, which is a quick and convenient way, it becomes necessary to counteract the destructive effects of excessive expansion and contraction upon the metal, and I accomplish this by forming the blank accordingly, the method being substantially the provision of surplus metal in such places where extensive expansion takes place, so that instead of the metal itself receiving the strain such strain is accommodated by simply drawing more or less from the surplus metal previously provided and which surplus is taken up while the piece is shaped in the stamping-press.

Where the contemplated articles are to be formed between the two opposing dies of a press, they cannot be formed very well of a number less than two pieces; but as such my invention is a distinct improvement over rain-water cut-offs, as shown in my prior patent of October 13, 1891, No. 460,953, and devices similarly constructed and in which the least number of pieces, referring to the shell or inclosure only, is three.

In my present construction the rain-water cut-off presents substantially a piece of tube bent on a semicircle, so as to bring its ends in line with each other, to which ends the usual pipes are attached. In the highest part or apex of the semicircular piece there is an opening to permit the general supply-pipe to attach and enter. The bend may also be less than a semicircle, so that the ends of the tube are at an angle to each other, which may be practically any angle less than one hundred and eighty degrees, and if they are at right angles to each other the article may serve as an elbow for stovepipes or other purposes. In such case the third or inlet opening in the upper part of the cut-off is of course not required.

The line on which the article is divided for manufacturing purposes may be in a plane parallel to the axis of the tube or at right angles thereto. In either case the resulting halves or parts may be readily stamped or pressed to a shape complementary to each other, so that when connected they form the complete article as intended. The success of this stamping or pressing is subject, however, to a certain preparation of the blank, as will be presently explained, and whereby tearing and breaking of the metal by reason of excessive strain is prevented.

Referring now to the drawings, 21 indicates the open ends of the tubular articles, to which ends further pipe connections are made, which pipes, in the case of a rain-water cut-off, constitute the so-called "branch" pipes, one leading to the cistern, the other being the waste-pipe. As shown in Figs. 1, 3, 9, and 10, illustrating rain-water cut-offs, these open ends are in line with one another, for which reason the pipes to be attached to these ends will be disposed parallel to each other. As shown in Figs. 2 and 15, illustrating elbows, these ends are at right angles to each other, and the pipes to be attached thereto are disposed at corresponding angles. These ends may, however, be arranged at any intermediate angle, and the resulting structures may serve for any special purpose, as rain-water cut-offs, elbows, or otherwise. In case of rain-water cut-offs there is an additional opening 22, where the inlet-pipe is to be connected, which opening in the case of elbows is of course not needed. In the method of construction illustrated on the first sheet of the drawings the line of division between the complementary parts is parallel to and coincident with the axis of the device. This line is also the line along which these parts are connected and is therefore represented by the seam at the joint, there being an outer seam 23 and an inner one 24. In the method of construction illustrated on the second sheet the line of division is in a plane at right angles to the plane in the first method and is also represented by the seam at the joint, there being a seam 25 at each side. The edges which are to be joined and thereafter form these seams are also indicated with similar numbers in the other views.

It will be observed that in each case the metal is curved in two directions at the same time, one curve resulting from the tubular shape of the wall and the other resulting from the turn or bend of the tube. Toward the outside of this latter and where the bend follows the largest radius the curvature is not so pronounced and more flat, and the shaping of that particular part presents no difficulty, the metal readily yielding to the limited strain, the same as in stamping shallow tinware. This is not the case, however, at the inside or at what might be termed the "crotch," where the turn is on a short radius and the curvature more pronounced, thus intensifying the strain and tension on the metal. This part is shown at 26 in all figures where it appears, its location being also indicated in the blanks by the same number. To offset the strain on the metal blanks at these points while in the press, I provide additional metal thereat and sufficiently so to accomodate the draw of the dies, but preferably not more. This surplus metal must be in the proper place of the blank and, as shown at 26 in Figs. 8 and 13, so as to be in the center part thereof, as shown in Figs. 7 and 12. It is obtained in any suitable way by folding, doubling up, or overlapping, the device for doing such work being properly adjusted, so that the exact amount and always to an equal extent to suit requirements is taken up. A convenient way of providing for this extra metal is illustrated in Fig. 6. If the blanks are so prepared, the desired shape may now be readily obtained by presswork between properly-shaped dies. At the critical stages of this operation and when the blank is forced into the final shape tearing of the metal around the portions forming the crotch, which would otherwise be unavoidable, is now prevented by reason of the presence of the surplus metal provided beforehand by overlapping at 26 and of which metal more or less is used, the folded-up portions of the blank being simply drawn out and apart again. At the same time where there is any contraction, there being a little in the upper part of the article, such is provided for by this doubling up, which is the equivalent of such contraction, having been started in the blank and is simply continued in the same direction as started and while the blank is in the press. These movements of the metal may be best understood by reference to Figs. 4, 6, and 7, where $a$ indicates the edges or corners produced by the folding up of the blank at 26. It will be observed in the lower part of Fig. 4, being the upper part of the article when completed and in position as shown in Fig. 1, that said edges or corners $a$ have been pushed closer together than what they were in the blank. (See Fig. 6 and also dotted lines in Fig. 7.) This is due to the contraction of the metal which that part of the blank suffers while in the press. It will likewise be seen in the upper part of said Fig. 4, being the part forming the crotch, that the metal starts to draw apart, so that said edges, pushed close together below, commence to diverge until the extreme corners are reached, where the metal previously folded up in the blank is again and at the ends entirely drawn out and fully as flat as it was in the original blank as it appears in Fig. 8. But for this previously-provided surplus of metal at this part the blank would have been torn apart to an extent represented by the divergence of said corners $a$. The same events take place in the form of construction shown on the second sheet of the drawings, the difference between the two forms being only the line of division of the two complementary parts, or, which is the same, the location of the seams. These latter may be of any kind used in such work and require no further description. The shaping of the outer section of this form, the blank of which is shown in Fig. 14, presents no particular difficulty, since it is quite shallow and without any abrupt or short turns. The formation of the slight flange 27 around the upper opening in the cut-off presents no particular difficulty and is readily obtained between the dies of the press. The customary tipping valve, pivotally supported within the shell to change the direction of flow when the device is used as a rain-water cut-off and as shown in Figs. 1 and 9, has likewise no bearing on my invention. The slight extra work required to provide for the surplus metal at 26 in the blanks is not sufficient to detract from the immense advantage in saving of time and labor of producing the shape by presses and dies.

While I have stated at the beginning that one of my objects was to reduce the number of parts or sections of which such an article is made and which number I have reduced to two, I am aware that stovepipe-elbows have been made of one piece by corrugating the metal. However, in making an elbow in such a way it is impossible to obtain the right angle on so short a turn as I produce it and which enables me to use much smaller pieces, thereby saving material. I am also aware that efforts have been made in the manufacture of articles in a manner similar to mine to take up surplus metal by corrugations or turns or bends of a certain shape. None of these result, however, in a round or tubular article bent at an angle and presenting smooth sides or walls devoid of corrugations.

Having described my invention, I claim as new—

1. A tubular article which is bent at an angle, the same consisting of two sections complementary to each other, each struck up and shaped out of one piece of sheet metal which pieces are afterward joined to form the article complete, surplus metal at the inside of the turns being disposed of by overlapping and surplus surface being provided for by drawing apart again portions of such overlapped surplus metal, such latter being flattened down smoothly resulting in a surface devoid of corrugations.

2. A sheet-metal article, parts of which are curved in two directions or planes at the same time, metal in excess of the superficial area required at such places being provided by overlapping portions of the blank correspondingly to prevent tearing thereat and to compensate for the action of the press-dies whereby parts of the overlapping metal are drawn apart again, resulting in an article of smooth surface and devoid of corrugations.

3. A blank for a tubular article to be bent at an angle and containing at its inner side portions where the metal is curved in two directions at the same time and which blank contains surplus metal for such portions obtained by folding, doubling up, or otherwise bending the blank before subjected to the operation of the press-dies and which surplus metal compensates for the draw of these latter and by being more or less flattened and straightened out again prevents breakage of the blank thereat.

4. An article of tubular shape bent at an angle which causes parts of it at the inner side of the turn to be curved in two directions at the same time, said article consisting of two sections shaped by press-dies to be complementary to each other, so as to permit their ultimate connection to complete the intended article, forming the same with a round and smooth side devoid of corrugations, such parts of the blanks out of which these sections are shaped and which are at the inner sides of the turn where the metal is curved in two directions, being provided with surplus metal obtained by folding, doubling up or otherwise bending the blank thereat so as to prevent tearing at these places when the blanks are subjected to the action of the press.

In testimony whereof I hereunto set my hand in the presence of two witnesses.

THOMAS F. CRARY.

Witnesses:
E. G. PROBST,
GLENN SMITH.